March 22, 1960     R. J. KUTZLER     2,929,583
AUTOMATIC STEERING MECHANISMS
Filed Sept. 25, 1953     2 Sheets-Sheet 1

INVENTOR.
ROBERT J. KUTZLER
BY George H. Fisher
ATTORNEY

United States Patent Office 2,929,583
Patented Mar. 22, 1960

2,929,583

AUTOMATIC STEERING MECHANISMS

Robert J. Kutzler, St. Louis Park, Minn., assignor to Minneapolis-Honeywell Regulator Company, Minneapolis, Minn., a corporation of Delaware Application September 25, 1953, Serial No. 382,312

12 Claims. (Cl. 244—77)

This invention pertains to control apparatus for a dirigible craft wherein said dirigible craft is controlled by an automatic pilot. The invention relates to a monitoring system for such automatic pilot which is operative on faulty operation of said automatic pilot. The invention further pertains to an improvement in the automatic pilot wherein a vertical gyroscope is supported upon a platform tiltable respectively about an axis parallel with the longitudinal axis of the dirigible craft and also tiltable about an axis parallel to the lateral axis of the craft. Where such dirigible craft is an aircraft, the tilting of the platform about the longitudinal axis of the craft is used to control the operation of the aileron and rudder thereof while when said platform is tilted about the axis parallel to the lateral axis the elevators of said aircraft are controlled.

The monitoring device provided herein is for an automatic pilot of an aircraft which aircraft may rotate about its vertical, longitudinal, and lateral axes from a predetermined attitude with respect to these axes. The automatic pilot includes sensing means responsive to craft changes in attitude about these axes. The sensing means operates through a control surface operation initiation means to exert moments on the craft in a sense to restore the craft to a predetermined attitude. The automatic pilot includes further devices effective to change the predetermined attitude of the craft.

The monitoring device of the present invention constitutes a safety arrangement that is adapted to modify the performance of the control surface operation initiation means when the craft has reached a predetermined attitude so that the operation initiation means is rendered ineffective when it persists in effecting an operation tending to increase said attitude.

The monitoring device of the present invention compares the response of a craft attitude sensing device and a control surface operation initiation means as to phase and amplitude and prevents the operation of said control surface from said initiation means when the phases are alike and when the craft has attained a predetermined attitude but permits the operation of the control surfaces if the phases are unlike despite the craft attaining the predetermined attitude.

The automatic pilot includes in the operation initiation means a rebalancing system operable through an electronic amplifier to reversibly control the servomotor that positions a control surface. The monitoring device of the present invention is concerned with the safety of the aircraft in the event of malfunction in the operation initiation means due to failure to rebalance the system, structural failures in the electronic amplifier, or for other causes.

The aircraft is subject to exterior transient disturbances which cause the aircraft to change its attitude about its axes. These changes in attitude are detected by the sensing devices, and cause operation of the control surfaces to restore the original attitude to the craft. If the automatic pilot with its operation initiation means for the control surfaces incurred a malfunction due to any one of the stated causes the operation of a control surface might be in such a direction that the moment applied by the displaced control surface to the aircraft adds to the original disturbance to increase the change in attitude of the craft about the particular axis involved. Also, if the control surface be displaced in the proper direction to return the craft to its original attitude, if the rebalancing system incurred a failure, the craft would not only regain its original attitude but would move beyond this position and conceivably could attain a large reverse attitude departure before the sensing means could function to oppose such reverse change of attitude.

The present monitoring system is particularly directed to correct for such functioning of the automatic pilot by ascertaining when a predetermined change in attitude has been attained and modifying the operation of the automatic pilot when such predetermined change in attitude has been attained so that the automatic pilot is rendered ineffective to aid in increasing further this change in attitude.

A further object of the invention is to provide for reverse operation of the control surface when the aircraft has reached a predetermined change in attitude while preventing operation of the control surface in such a direction as to increase the change in attitude.

A further object of the invention is to disengage the automatic pilot from the control surfaces when a maximum attitude of the aircraft is attained.

Further aspects and the structural details of the invention will be apparent from the accompanying description when read in connection with the annexed drawings, wherein—

Figures 1A, 2:
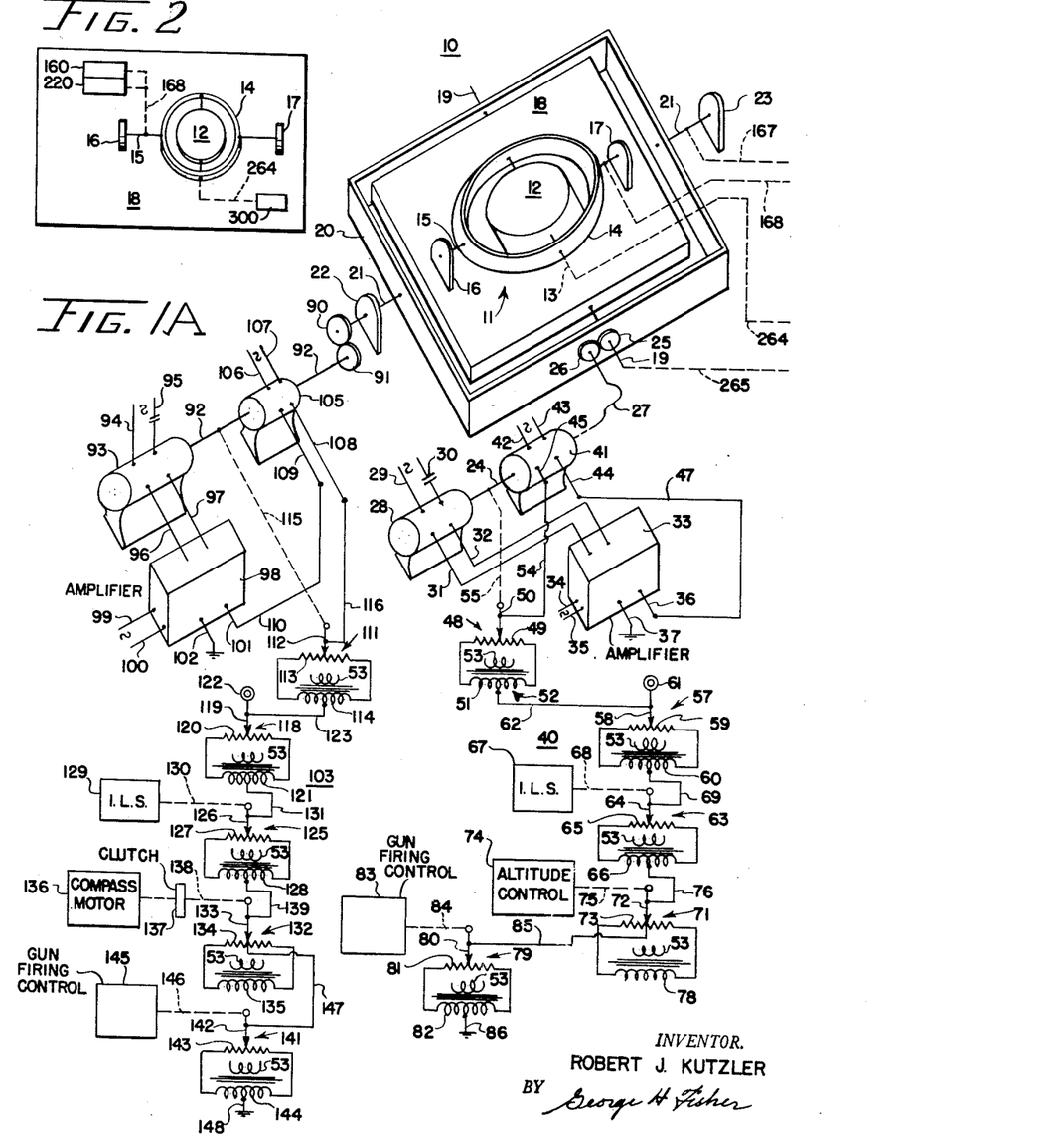
Figures 1a and 1b together constitute a schematic arrangement of an automatic pilot including a monitoring system for controlling the attitude of an aircraft about its three axes.
Figure 2 is a modification of Figure 1b.

Referring to Figure 1a, a device 10 comprising an inertial device such as vertical gyroscope 11 supported on a tiltable platform 18 supplies displacement signals for controlling the angle of bank, the pitch attitude about the lateral axis, and the angular position of the craft about its vertical or yaw axis. The gyroscope 11 conventionally includes a rotor (not shown) mounted in a casing 12 on a vertical spin axis. The casing 12 is supported on axis 13 by a gimbal ring 14. The gimbal ring 14 in turn is carried on axis 15 by pedestal bearings 16, 17 upstanding from the platform 18. The axes 13 and 15 are normally horizontal and are respectively perpendicular. The gyroscope rotor is conventionally maintained perpendicular to the surface of the earth by erecting means (not shown). The platform 18 is supported about axis 19—19 in a rotatable gimbal ring 20. The gimbal ring 20 in turn is supported about axis 21—21 in pedestal bearings 22, 23 carried by the craft. The axes 13 and 19 are respectively parallel to the pitch axis of the aircraft while the axes 15 and 21 are parallel with the longitudinal or roll axis of the craft.

As will be apparent hereinafter, the aircraft is stabilized about its roll and pitch axes in predetermined attitudes by the vertical gyroscope 11. Selected changes in pitch attitude and in roll attitude are obtained by rotating the paltform 18 about the axes 19 and 21. For rotating the platform 18 about axis 19 there is secured to axis or shaft 19 a pinion 25 meshing with a driving pinion 26 rotatably carried in the gimbal ring 20. The gear 26 is driven from a flexible shaft 27 connected to the shaft 24 of a drive motor 28. The gear train represented by gears 25, 26 is selected to limit the maximum angular turning rate of platform 18 to the pitching rate desired for the particular aircraft.

The motor 28 may be a reversible, capacitor type induction motor having a line winding energized by means of conductors 29, 30 from an alternating voltage supply and a control winding energized by conductors 31, 32 from an A.C. discriminator amplifier 33. The amplifier 33 includes connections 34, 35 extending thereto from the alternating voltage supply and control signal input connections 36, 37 energized from a balanceable network 40. The direction of rotation of the motor 28 depends upon the phase relationship of the voltage across signal input connections 36, 37 relative to the voltage across supply connections 34, 35. The capacitor motor-amplifier combination is well known in the art, one example being illustrated by the patent to Taylor No. 2,388,350.

Balanceable network 40 includes a plurality of sources of control voltage connected in series relationship. These sources are a velocity voltage signal generator 41, a rebalancing potentiometer 48, a manual trim potentiometer 57, a glide path control potentiometer 63, an altitude control potentiometer 71, and a gun firing control potentiometer 79. Velocity voltage signal generator 41 conventionally includes a primary winding connected to an alternating voltage supplied by conductors 42, 43; a secondary winding having output conductors 44, 45 and a rotor which on rotation inductively associates the secondary winding with the primary winding with the magnitude of the induced voltage depending on rotor speed. The rotor is driven from the output shaft 24 of the control motor 28. The secondary winding conductor 44 through an intermediate conductor 47 is connected to the amplifier conductor 36. The rebalance potentiometer 48 includes a slider 50 and a resistor 49, the resistor being connected across a secondary winding 51 of a transformer 52 having a primary winding 53. The velocity generator secondary conductor 45 through an intermediate conductor 54 is connected to slider 50. Slider 50 is positioned along resistor 49 by follow-up driving connection 55 extending from the motor shaft 24. Potentiometer 57 comprises a slider 58 and a resistor 59. The resistor 59 is connected across a secondary winding 60 of the transformer 52. Since a single primary winding of a transformer may energize a plurality of secondary windings, a common primary winding is indicated in the several potentiometer arrangements. Slider 58 may be positioned along resistor 59 by a manually operable knob 61. A conductor 62 connects slider 58 with a center tap of secondary winding 51. Potentiometer 63 comprises a slider 64 and resistor 65 with the resistor being connected across secondary winding 66 of the transformer. An instrument landing system motor 67 through an operating connection 68 positions slider 64 relative to resistor 65. Slider 64 is positioned by motor 67 relative to resistor 65 in accordance with a control signal derived from a glide path receiver in a manner well known in the art. A motor operable in accordance with such glide path signal is disclosed in Patent No. 2,423,337 to Moseley, wherein Figure 2 illustrates a motor 40 analogous to the motor 67 herein. A conductor 69 connects slider 64 with a center tap of secondary winding 66. Potentiometer 71 comprises a slider 72 and resistor 73. The resistor 73 is connected across the secondary winding 78 of the transformer. Slider 72 is positioned along resistor 73 in accordance with departures in altitude of the craft from a selected altitude by a suitable altimeter control 74 through its operating means 75 operably connected to slider 72. The altitude control may be such as is disclosed in Figure 2 of the patent to Kellogg II et al. 2,415,429. Conductor 76 connects slider 72 with a center tap of secondary winding 66. Potentiometer 79 comprises a slider 80 and a resistor 81. Resistor 81 is connected across a secondary winding 82 of the transformer. Slider 80 is positioned along resistor 81 by gun firing control computator 83 through a suitable operating means 84. A conductor 85 connects slider 80 with a center tap of resistor 73. A conductor 86 extends from a center tap of secondary winding 82 to ground and the signal input circuit is completed through the ground conductor 37 of the amplifier 33. No contention is made of any novelty in adjusting the various potentiometers of the network from the various control devices and the potentiometers are merely representative of how extraneous controls may be introduced.

Rotation of platform 18 about axis 21 is obtained from a driving means comprising a gear 90 secured to the axis 21 which meshes with a driving gear 91 carried on an output shaft 92 of a drive motor 93. The gear train represented by gears 90, 91 is selected to limit the maximum angular turning rate of the platform 18 to the rolling rate desired for the particular aircraft. The motor 93 like motor 28 is a reversible capacitor type induction motor having a line winding connected by conductors 94, 95 to an alternating voltage supply and a control winding connected for energization by conductors 96, 97 to a motor control amplifier 98. The amplifier 98 like amplifier 33 is of the A.C. discriminator type and has power conductors 99, 100 connected to the alternating voltage supply and control signal conductors 101, 102 connected to a balanceable network 103. The direction of rotation of the motor 93 depends upon the phase relationship of the supply voltage across conductors 99, 100 relative to the control signal voltage across conductors 101, 102. The amplifier-motor combination may be similar to amplifier 33 and motor 28.

Balanceable network 103 includes a velocity voltage signal generator 105, a rebalance potentiometer 111, a manually operable potentiometer 118, an instrument landing system potentiometer 125, a compass operated potentiometer 132, and a gun fire control computer operated potentiometer 141. The velocity voltage signal generator 105 is similar to the velocity voltage signal generator 41 and comprises a primary winding having conductors 106, 107 connected to the alternating voltage supply and a secondary winding inductively related to the primary winding by the rotation of a rotor driven by motor shaft 92. The secondary winding includes output connections 109, 108. An intermediate conductor 110 extends from connection 109 to amplifier connection 101. Potentiometer 111 comprises a slider 112 and a resistor 113. The resistor 113 is connected across a secondary winding 114 of the transformer. Slider 112 is positioned along resistor 113 by a follow-up connection 115 driven from the motor shaft 92. An intermediate conductor 116 extends from velocity voltage signal generator connection 108 to slider 112. Potentiometer 118 includes a slider 119 and resistor 120. Resistor 120 is connected across a secondary winding 121 of the transformer. Slider 119 may be positioned along resistor 120 through a suitable operating knob 122. A conductor 123 connects a center tap of secondary winding 114 with slider 119. Potentiometer 125 comprises a slider 126 and resistor 127. Resistor 127 is connected across a secondary winding 128 of the transformer. An instrument landing system motor 129 through a suitable operating connection 130 positions slider 126 along resistor 127. The motor 129 positions slider 126 relative to resistor 127 in accordance with the magnitude of a signal, indicative of the displacement of the craft from a ground track, derived from a localizer range receiver. The motor may be similar to motor 27 in Figure 2 of Patent 2,423,337 to Moseley. Potentiometer 132 comprises a slider 133 and resistor 134. Resistor 134 is connected across a secondary winding 135 of the transformer. Slider 133 is positioned along resistor 134 in accordance with changes in heading of the craft. This operation is achieved by a compass motor 136 which operates through a clutch 137 and a suitable operating means 138 connected to slider 133. The compass motor 136 may be similar to motor 32, Figure 1 in the patent to Noxon et al. 2,516,-

796 and the clutch 137 corresponds with the magnetic clutch in the patent which transmits the motion of motor 32 to a transmitter 77. A conductor 139 connects slider 133 with a center tap of secondary winding 128. Potentiometer 141 includes a slider 142 and a resistor 143, which is connected across a secondary winding 144 of the transformer. A gun fire control computer 145 through suitable operating means 146 positions slider 142 along resistor 143. The conductor 147 connects slider 142 with a center tap of resistor 134. A conductor 148 connects a center tap of secondary winding 144 to ground and the input circuit to amplifier 98 is completed through the amplifier ground connection 102. The various potentiometers in network 103 are illustrative of the manner of introducing extraneous control signals. It is to be understood that only one of the control devices 129, 136 or 145 will control network 103 at any one time. Thus if instrument landing system control is to be applied the compass motor 136 will be ineffective to position slider 133 and similarly the gun firing control computer 145 will be ineffective to position slider 142. Similarly for network 40, but one of the control devices 67, 74, 83 will be effective at one time.

Figure 1B:
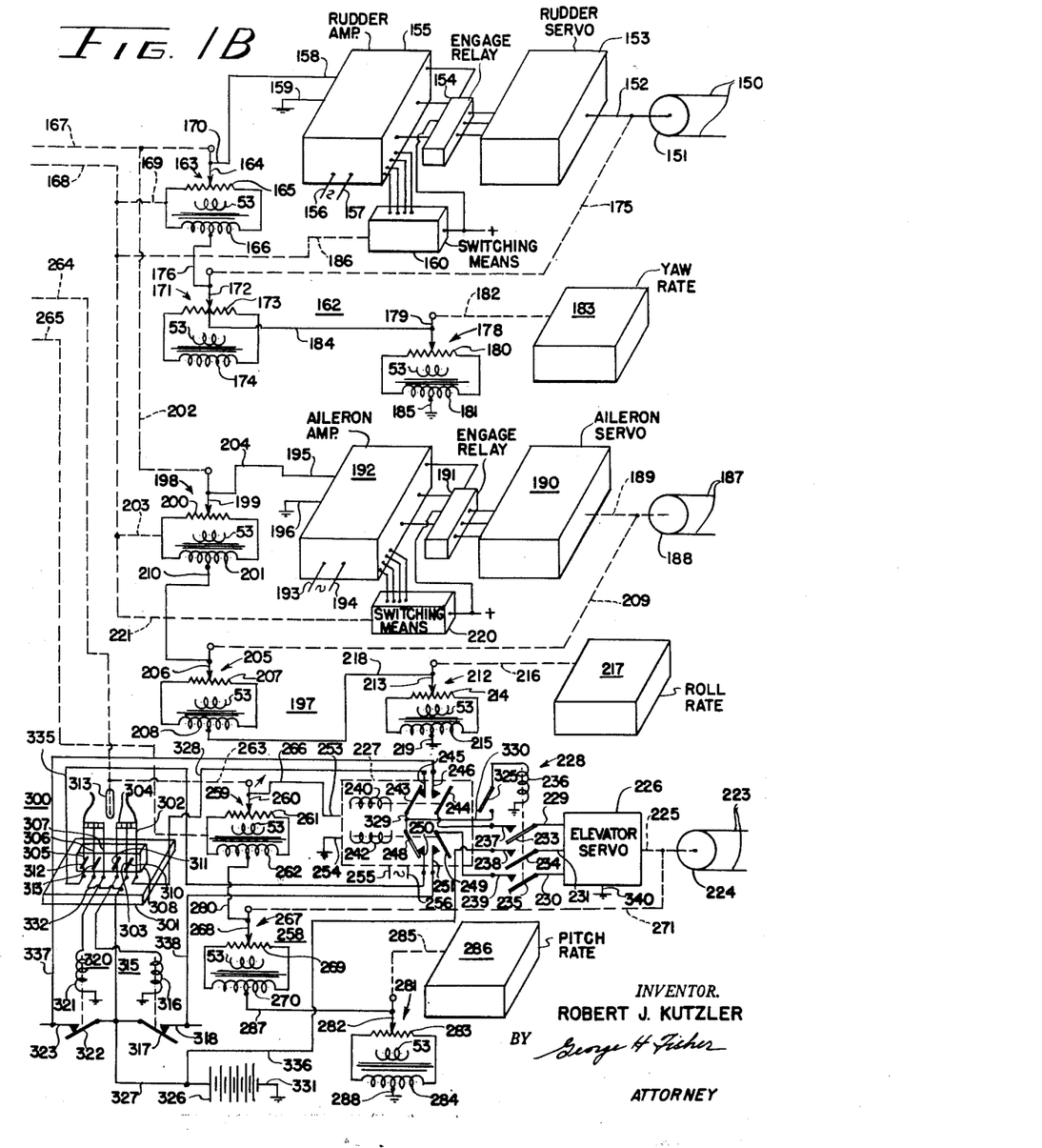

In Figure 1b are three independent servomotors for operating the rudder, ailerons, and elevator control surfaces of the aircraft. The rudder control surface (not shown) is operated by cables 150 extending from a cable drum 151 carried on an output shaft 152 of a rudder servomotor 153. The motor 153 is reversibly controlled through a rudder engage relay 154 from a rudder servomotor amplifier 155. The amplifier 155 is of the A.C. discriminator type having power input connections 156, 157 energized from the alternating voltage supply and control signal input connections 158, 159 energized from a balanceable control network 162. Amplifier 155 includes a pair of relays one of which controls the rotation of the motor 153 in one direction and the other controlling the rotation of motor 153 in the opposite direction. One or the other of the relays is operated depending upon the phase relationship of the voltage across supply connections 156, 157 relative to the voltage across signal input connections 158, 159. The rudder amplifier and rudder servomotor may be similar to that disclosed in Patent 2,466,702 to Hamby. The servomotor may be operatively engaged with its amplifier and cable drum 151 through an engage relay 154 whose energization is controlled by a switching means 160. The switching means 160 will be more fully described hereinafter in connection with the elevator channel.

Rudder amplifier control signal network 162 comprises a rudder potentiometer 163, a rebalancing potentiometer 171, and a yaw rate potentiometer 178. Potentiometer 163 includes a slider 164 and resistor 165. Resistor 165 is connected across a secondary winding 166 of the transformer. Slider 164 is connected by suitable operating means 167 with axis 21 of the device 10. Slider 164 is thus positioned in accordance with the tilt of platform 18 about axis 21. Resistor 165 is positioned by suitable operating connections 168, 169 in accordance with the rotation of axis 15, and thus in accordance with the relative angular movements of the platform 18 and gyroscope 11 about axis 15. Potentiometer 163 constitutes a pick-off in which slider 164 is moved relative to resistor 165 in accordance with the relative angular position of said platform 18 and gyroscope 11. A conductor 170 extends from slider 164 to amplifier connection 158. Potentiometer 171 comprises a slider 172 and a resistor 173 which is connected across the secondary winding 174 of the transformer. Slider 172 is positioned along resistor 173 by a follow-up operating connection 175 extending thereto from the servomotor shaft 152. A conductor 176 connects a central tap of secondary winding 166 and a slider 172. Potentiometer 178 includes a slider 179 and resistor 180 which is connected across a secondary winding 181 of the transformer. Slider 179 is positioned along resistor 180 by a suitable operating connection 182 extending therefrom to a yaw rate gyroscope 183. The yaw rate gyroscope 183 is of the conventional type wherein a rotor with two degrees of angular freedom about axes at right angles to one another, one axis being the spin axis the other being the precession axis. Movement about the precession axis is limited by restraining means so that as the craft turns about its vertical axis the rotation of the rotor about its precession axis is limited by the restraining means and varies with the rate of turn of the craft about the vertical axis or varies with its rate of yaw. A conductor 184 connects the center tap of resistor 173 with slider 179. A conductor 185 extends from a center tap of secondary winding 181 to ground and the amplifier control circuit is completed through the amplifier ground connection 159. The switching means 160 is operated in accordance with the relative angular position of the craft and vertical gyroscope 11 by a suitable operating means 186 connected to the operating means 168.

The aileron control surfaces are positioned by cables 187 extending from a cable drum 188 fixed to an output shaft 189 of an aileron servomotor 190. The aileron servomotor 190 is reversibly controlled through an engage relay 191 by an aileron servomotor amplifier 192. The aileron amplifier 192 is of the A.C. discriminator type, and the amplifier-servomotor combination for positioning the ailerons may be similar to that provided for the operation of the rudder. The amplifier includes power input connections 193, 194 extending from the amplifier to the alternating voltage source. The amplifier also includes signal input connections 195, 196 connected to a balanceable network 197 for the application of control signals.

Network 197 comprises a banking potentiometer 198, a rebalancing potentiometer 205, and a roll rate potentiometer 212. Potentiometer 198 comprises a slider 199 and resistor 200 which is connected across a secondary winding 201 of the transformer. A branch operating means 202 connects slider 199 with the operating means 167 positioned in accordance with the movement of platform 18 relative to the craft about axis 21. A branch operating means 203 connects potentiometer resistor 200 with the operating connection 168 to position resistor 200 in accordance with the relative angular position of the craft and gyroscope 11. Thus potentiometer 198 constitutes a pick-off whose output is proportional to the relative angular position of the platform 18 and gyroscope 11. A conductor 204 connects slider 199 with the amplifier input connection 195. Potentiometer 205 comprises a slider 206 and resistor 207 which is connected across a secondary winding 208 of the transformer. Slider 206 is positioned by a follow-up operating connection 209 extending therefrom to the servomotor output shaft 189. The conductor 210 connects slider 206 with a center tap of secondary winding 201. Potentiometer 212 comprises a slider 213 and resistor 214. Resistor 214 is connected across a secondary winding 215 of the transformer. Slider 213 is positioned along resistor 214 by a suitable operating connection 216 extending therefrom to a roll rate gyroscope 217. The roll rate gyroscope is of the conventional type and displaces slider 213 relative to resistor 214 in accordance with the rate of roll of the aircraft. The gyroscope may be similar to the yaw rate gyroscope 183 with its mounting differently oriented. A conductor 218 connects slider 213 with a center tap of secondary winding 208. The network is completed by a ground conductor 219 extending from a center tap of secondary winding 215, and the network connection to the amplifier 192 is completed through the amplifier ground connection 196. The aileron operating means includes a switching means 220 similar to the rudder switching means 160. The switching means 220 is operated in accordance with the relative position of the gyroscope and craft by a suitable operating connection 221 connected to the operating means 168.

The elevator channel of the automatic pilot with respect to the operating means is shown more in detail than the aileron and rudder channels, but it is to be understood that each channel is supplied with similar components and the details of some of these components are set forth in connection with the elevator channel only to avoid unnecessary duplication. The elevator control surface is positioned by cables 223 extending from a cable drum 224 secured to an output shaft 225 of an elevator servomotor 226. The elevator servomotor 226 is reversibly operated from an elevator servomotor amplifier 227 through an elevator engage relay 228. The amplifier-servomotor combination is similar to that provided in the aileron and rudder channels. The servomotor 226 includes an input connection 229 which when connected to a source of voltage effects upward movement of the elevator surface, an input connection 230 which when energized effects downward movement of the elevator control surface, and an input connection 231 which when energized serves to operatively engage the servomotor 226 with its cable drum 224 as is more fully disclosed in the patent to Hamby referred to above.

The engage relay 228 is of the three pole single make type having arms 233, 234, 235 coacting respectively with contacts 237, 238, and 239. Movement of the three relay arms is secured by an operating winding 236 of the relay. Servomotor conductors 229, 230, and 231 are connected respectively to arms 233, 235, and 234.

The amplifier 227 includes a pair of relay operating windings 240, 242. Winding 240 operates relay arms 243, 244 which coact respectively with an out contact 245, and an in contact 246. Relay winding 242 operates arms 248, 249 which are associated with an out contact 250 and an in contact 251 respectively. The amplifier includes a pair of signal input connections 253, 254 connected to a balanceable network 258 for supplying alternating voltage control signals thereto and power input connections 255, 256 extending therefrom to the alternating voltage supply. One or the other of the windings 240, 242 is energized depending upon the phase relationship of the voltage across signal input terminals 253, 254 with respect to the voltage across supply terminals 255, 256.

The balanceable network 258 for amplifier 227 comprises a pitch attitude potentiometer 259, a rebalancing potentiometer 267, and a pitch rate potentiometer 281. Potentiometer 259 comprises a slider 260 and resistor 261. Resistor 261 is connected across a secondary winding 262 of the transformer. Slider 260 is connected through a branch operating connection 263 and a primary operating connection 264 to axis 13 of the vertical gyroscope 11; and resistor 261 is connected through operating connection 865 to the axis 19 of platform 18 so that potentiometer 259 constitutes a pick-off whose output depends upon the relative angular position of the gyroscope 11 and the platform 18. A conductor 266 connects slider 260 with the amplifier input connection 253. Potentiometer 267 comprises a slider 268 and resistor 269 which is connected across a secondary winding 270 of the transformer. Slider 268 is positioned along resistor 269 by a follow-up operating connection 271 extending therefrom to the servomotor output shaft 225. A conductor 280 connects slider 268 with a center tap of secondary winding 262. Potentiometer 281 comprises a slider 282 and resistor 283 which is connected across a secondary winding 284 of the transformer. Slider 282 is positioned along resistor 283 through a suitable operating connection 285 connecting said slider with a pitch rate gyroscope 286. The pitch rate gyroscope is of the conventional type and is so arranged on the craft that slider 282 is displaced relative to resistor 283 in accordance with the rate of pitch of the craft. A conductor 287 connects slider 282 with a center tap of secondary winding 270. The network is completed by a ground conductor 288, and the signal input circuit is completed to the amplifier 227 through the amplifier ground connection 254. Thus any unbalanced voltage in network 258 appears across slider 260 and conductor 288 and this voltage is applied to the input connections 253, 254 of amplifier 227.

The amplifier, for controlling a servomotor, and its associated network constitutes an operation initiation device which serves through an energized engage relay to reversibly control its servomotor and thus a control surface. The switching means for controlling continued energization of the engage relay and thus the operative engagement of a servomotor with its cable drum as well as the arrangement for causing the termination of the operation of a servomotor without rebalance of the amplifier network will now be described. While each channel of the automatic pilot and thus each servomotor is provided with such switching means, the arrangement of the details of this switching means is shown only in connection with the elevator servomotor and is merely broadly indicated in the rudder and aileron channels.

A switching means 300 thus controls the continued engagement of the elevator servomotor with its cable drum and also controls the termination of the operation of the servomotor despite the unbalance of the network 258 of the elevator servomotor amplifier 227. The switching means 300 comprises a base 301 having pivoted thereon upstanding switch contacts 302, 303, 304, which comprise one set of contacts; and switch arms 305, 306, and 307 which comprise the second set. The outer switch arms 302 and 305 are elongated and are biased in an inward direction whereas the intermediate arms 303 and 306 as well as the inner arms 304 and 307 are biased in an outward direction. An arm 313 normally directed upward in the figure is supported on the operating means 264. The arm when rotated engages one or the other of the elongated switch arms 302, 305. It should be noted that arm 313 is moved concomitantly with the slider 260 of potentiometer 259 but is angularly displaced approximately 180° therefrom so that when slider 260 for example is moved to the right along resistor 261, the arm 313 will be moved toward the left in the direction to engage switch arm 305. A stop mount is supported on the upper surface of base 301 adjacent the switch arms. Laterally extending from the stop mount are stops 310, 311, 312, and 313. The arrangement is such that as the elongated switch arm 302 is moved outward by arm 313, the inner switch arm 304 as it follows arm 302 engages stop 311 before the intermediate switch arm 303 as it follows arm 302 engages its stop 310. Similarly, if elongated switch arm 305 is moved outwardly by actuating arm 313, the arrangement is such that the inner arm 307 engages stop 313 before the intermediate switch arm 306 engages stop 312. The engagement of the intermediate switch arm 303 and the outer elongated arm 302 controls the energization through the amplifier contacts 245 and 243, the energization of the engage relay winding 236. The engagement of intermediate switch arm 303 and the inner switch arm 304 controls the energization of an operating winding 316 of a relay 315. The relay 315 is a single pole single break type having an operating arm 317 and an out contact 318. The relay arm 317 and contact 318 through amplifier contact 251 and relay arm 249 controls the termination of the operation of the servomotor 226 despite the unbalance in the amplifier network 258. The engagement of intermediate switch arms 306 and elongated outer switch arm 305 through the amplifier relay contact 250 and relay arm 248 also controls the continued energization of the engage relay winding 236. The engagement of intermediate switch arm 306 and inner switch arm 307 controls the energization of an operating winding 321 of a single pole single break relay 320 which additionally includes an arm 322 coacting with an out contact 323. The disengagement of arm 322 and contact 323 through the amplifier relay contact 246 and arm 244 controls the termination of the servomotor 226 operation in the opposite direction despite the unbalance of amplifier network 258. Having described the major components of the system, their interrelation will be more fully discussed in a description of the operation of the system.

Preliminary to the institution of automatic stabilization, a single pole single throw switch 325 will be closed to complete an energizing circuit for the operating winding 236 of the aileron engage relay 228 the circuit comprising battery 326, conductor 327, parallel circuits comprising on the one hand intermediate switch arm 303, outer elongated switch arm 302, conductor 328, amplifier relay contact 245, relay arm 243, conductor 329, conductor 330, manually operable switch 325, relay operating winding 236, to ground and return to battery ground 331, and on the other hand conductor 332, intermediate switch arm 306, outer elongated switch arm 305, conductor 335, amplifier relay contact 250, relay arm 248, conductor 329, conductor 330, manually operable switch arm 325, operating winding 236, to ground and return to battery ground 331. With the operating winding 236 energized the engage relay arms 233, 234, and 235 engage their respective contacts. As more fully disclosed in the patent to Hamby, the engagement of the relay arm 234 with its contact 238 causes the operative engagement of the servomotor 226 with its cable drum 224. A similar preliminary operative step will have been made for the rudder engage relay 154 and the aileron engage relay 191.

The operation may be considered when the platform 18 which supports the vertical gyroscope 11 is not being rotated relative to the craft. The platform 18 at this time is assumed perpendicular to the spin axis of the rotor in casing 12. If the aircraft, due to a transient disturbance, tilts about its longitudinal axis, there will be a relative rotation of the platform 18 and gyroscope 11 about axis 15. In effect, the resistor 165 of the rudder potentiometer 163 and the resistor 200 of the aileron banking potentiometer 198 will be stabilized by the gyroscope 11 whereas the slider 164 of potentiometer 163 and slider 199 of potentiometer 198 being connected through the operating means 167 and the branch operating means 202, to the axis 21 now fixed relative to the aircraft will partake of the angular movement of the aircraft, so that potentiometer 163 and potentiometer 198 will each develop a voltage due to the movements of their sliders relative to the resistors in proportion to the magnitude of tilt of the craft about the longitudinal axis. The voltage from potentiometer 163 unbalances network 162. This unbalance is applied to rudder amplifier 155 which through the rudder engage relay 154 controls the direction of rotation of the rudder servomotor 153. The operation of the servomotor 153 through the follow-up drive 175 moves slider 172 relative to resistor 171 to rebalance network 162 to normally terminate operation of the servomotor. In a similar way the voltage from the banking potentiometer 198 unbalances the network 197 of the aileron amplifier 192. The aileron amplifier 192 through the aileron engage relay 191 controls the operation of servomotor 190 which positions the ailerons. The operation of the servomotor 190 through the follow-up drive 209 adjusts slider 206 relative to resistor 207 to develop a rebalance voltage in network 197. When this rebalance is achieved the servomotor 190 in a normal manner stops rotation. Under the applied ailerons and rudder, the aircraft moves toward its level attitude position about the roll axis so that the sliders 164 and 199 are moved toward the center of their respective resistors. In network 162 the voltage from potentiometer 171 exceeds that of potentiometer 163 and causes a reverse rotation of the rudder servomotor 153 to move it toward its normal or centered position. Similarly in the aileron amplifier network 197 the voltage from the follow-up potentiometer 205 now exceeds the voltage from the banking potentiometer 198 and causes reverse operation of the aileron servomotor 190 to move the ailerons toward their normal or centered position. As the craft reaches level position, the sliders 164 and 199 as in conventional proportional systems will have been returned to the center of their respective resistors and the rudder servomotor 153 and aileron servomotor 190 will have been reversely controlled so that their sliders 172 and 206 are centered on their respective resistors 173 and 207 with the rudder network 162 of the aileron network 197 in balanced condition.

The purpose of operating the rudder as well as the ailerons when the craft merely tilts about its longitudinal axis from a transient disturbance is to apply a rudder displacement which compensates for the tendency of the aircraft to yaw about its vertical axis due to the downward displacement of an aileron. Thus if the right aileron is lowered, a slight amount of left rudder is applied to prevent the craft from yawing toward the right.

With the craft in level attitude position, if a transient disturbance should cause the craft to tilt about its pitch axis, and with the slider 260 of the pitch attitude potentiometer 259 connected to the vertical gyroscope 11 through the operating connections 263, 264 the slider will be stabilized thereby whereas the resistor 261 being connected through the operating connection 265 to platform 18 and thus to the craft will move with the craft so that a relative displacement of slider 260 and resistor 261 results. This relative displacement develops a voltage from potentiometer 259 which unbalances the amplifier network 258. The unbalance of the elevator network 258 causes the operation of the elevator amplifier 227 which energizes one or the other of the relay windings 240 or 242. The operation of a relay winding causes the servomotor 226 to rotate and position the elevator in a direction to restore the craft to its original attitude. At the same time that the elevator is being positioned, the servomotor through its follow-up drive 271 positions slider 268 of the rebalance potentiometer 267 whereby the network 258 is rebalanced. The operation for example of the amplifier relay winding 240 completes a circuit from battery 326, conductor 327, relay arm 322, relay contact 323, conductor 337, amplifier relay contact 246, relay arm 244, engage relay contact 237, relay arm 233, servomotor conductor 229, servomotor 226, servomotor ground conductor 340, and return to battery ground 331. Alternatively, energization of amplifier relay winding 242 completes a circuit from battery 326, conductor 327, relay arm 317, relay contact 318, conductor 338, amplifier relay contact 251, relay arm 249, engage relay contact 239, relay arm 235, servomotor conductor 230, servomotor 226, servomotor ground conductor 340 and return to battery ground 331. Amplifier relay winding 240 causes upward movement of the elevator and energization of amplifier relay winding 242 causes downward movement of the elevator.

In the switching means 300, the base 301 is supported on the craft whereas the operating arm 313 is connected to the vertical gyroscope so that the arm 313 is moved relative to the base in accordance with the pitch attitude of the aircraft. If the craft, due to the transient disturbance, had assumed a "nose" down attitude slider 260 would have been moved toward the right on resistor 261 whereas arm 313 would have been moved toward elongated contact 305 of the switching means.

If due to some malfunction, the operation of the cable drum 224 during the energization of the amplifier relay winding 240 causes the elevator to be moved downwardly instead of upwardly, the craft due to this downward elevator would assume a steeper "nose" down attitude than that due to the transient disturbance before mentioned. With this greater departure from the level flight position, the arm 313 of the switch means 300 may have engaged the outer arm 305 and moved it a distance outward sufficient for the follower arm 307 to have engaged its stop 313 thereby interrupting the circuit, between the intermediate switch arm 306 and the inner switch arm 307, that energizes the operating winding 321 of relay 320. The relay arm 322 is thereby moved or drops to the out position to disengage it from relay contact 323. The separation of the relay arm 322 and relay contact 323 interrupts the servomotor energizing circuit assuming network 258 to be still unbalanced. With this interruption of the servomotor circuit, the elevator surface is not moved in a direction tending to increase the departure of the aircraft from its level flight condition. However, a circuit is maintained to permit the energization of the elevator servomotor 226 in the opposite direction. Additionally, should the aircraft depart from its normal level position an angular distance not only to cause the inner arm 307 to engage stop 313 but also cause the intermediate arm 306 to engage its stop 312, the energizing circuit for the operating winding 236 of the engage relay 228 is interrupted in both parallel paths one interruption being the separation of the switch arms 306 and 305 and the other being the separation of the amplifier relay arm 243 from its contact 245 due to the energization of the relay winding 240. The engage relay 228 being deenergized its relay arms drop to the out position, and the separation of relay arm 234 and contact 238 serve to operatively disengage the servomotor 226 from its cable drum 224.

It will be evident that if the transient disturbance has caused the craft to tilt upwardly, the slider 260 would have been moved toward the left along resistor 261 from its center position and the operating arm 313 for the switching means 300 would have moved toward the right in the direction to engage the elongated switch arm 302. Also if due to some malfunction the elevator surface had moved upwardly instead of downwardly to increase the "nose up" attitude of the craft, further movement of the elongated switch arm 302 outwardly would have caused the inner switch arm 304 to engage its stop 311 and thus open the existing circuit for energizing the operating winding 316 of relay 315 thereby deenergizing winding 316 whereby the relay arm 317 drops to the out position and disengages its contact 318. This separation of the relay arm 317 and relay contact 318 opens the energization circuit for the servomotor 226. Further, if the "nose up" attitude of the craft had been sufficient so that arm 313 had moved the elongated switch arm 302 a maximum amount, the intermediate switch arm 303 would have engaged its stop 310 to thereby cause a separation of the intermediate switch arm 303 from the elongated outer switch arm 302. Thus the energization circuit for the operating winding 236 of the engage relay 228 would have been interrupted in the two parallel branches one interruption being between intermediate switch arm 303 and outer elongated switch arm 302 and the other interruption being between amplifier relay arm 248 and its contact 250 during energization of the relay winding 242. Having considered the operation of the switching means 300 insofar as it terminates the operation of a servomotor in response to a predetermined angular deviation of the aircraft and gyroscope when the operation of the servomotor is in such a direction as to increase such angular deviation and additionally considering the operation for effecting the disengagement of the elevator servomotor from its control surface when the angular deviation of the gyroscope and aircraft has reached a maximum value, consideration will be given to the means whereby the platform 18 may be tilted with respect to the aircraft.

With the three servomotors engaged with their respective control surfaces, and should a transient disturbance cause the craft to change heading, the compass motor 136, Figure 1a, would displace slider 133 relative to resistor 134 to unbalance network 103 of the amplifier 98. The amplifier 98 would cause the motor 93 to rotate in a direction so that through its follow-up drive 115 slider 112 would be moved relative to resistor 113 to rebalance the network. The rotation of the motor 93 would be applied to the gimbal ring 20 to rotate the platform 18 about axis 21. The movement of the platform is transmitted by operating connection 167 to slider 164 of the rudder potentiometer 163 and through the branch operating connection 202 to slider 199 of the aileron banking potentiometer 198. The resistors 165, 200 do not change positions at this time. Under the signals developed by the movement of sliders 164 and 199 the rudder amplifier 155 and the aileron amplifier 192 cause the positioning of the rudder and ailerons. The applied rudder and ailerons cause the craft to turn and bank to return toward its original heading. As the craft banks, the relative displacement of the slider 164 and resistor 165 of potentiometer 163 and slider 199 and resistor 200 of potentiometer 198 decreases due to the opposite rotation of platform 18 with the craft so that the respective networks 162 and 197 are oppositely unbalanced from the preponderant voltages from the rebalance potentiometers causing the rudder and aileron surfaces to be moved back toward their normal position.

As the departure from the original heading decreases, the compass motor 136 moves slider 133 toward the center of resistor 134 whereby the network 103 is oppositely unbalanced since the voltage from potentiometer 111 at this time exceeds that from potentiometer 132. The motor 93 reversely moves the outer gimbal ring 20 and thus the platform 18. Initially the platform 18 had been displaced relative to the craft and to the gyroscope 11 to displace the rudder and ailerons, the aircraft in response to the displaced ailerons and rudder had banked until the platform 18 was again perpendicular to the spin axis of vertical gyroscope 11. When the heading departure decreased, the motor 92 is reversely rotated to angularly move the platform 18 relative to the gyroscope 11 in the opposite direction so that sliders 164 and 199 are moved to the left of the centers of their respective resistors 165 and 200 causing the displacement of the rudder and ailerons in the opposite direction from center to that initially given.

The opposite rudder and ailerons cause the craft to move toward its level attitude about the roll axis. This opposite rotation of the motor 93 decreases the angle between the platform 18 and a plane containing the pitch and roll axes of the aircraft. As the departure from heading continues to decrease the motor 93 continues to decrease the angular relation between the platform 18 and a plane defined by the roll and pitch axes of the craft.

The craft due to the operation of the ailerons always assumes an attitude so that the platform 18 will be perpendicular to the spin axis of the vertical gyroscope 11 and therefore tends to maintain sliders 164 and 199 at the center of their respective resistors. Thus as the motor 93 rotates the outer gimbal 20 to decrease the angle between the craft and platform 18, the aircraft under the applied ailerons continues to assume such an angle that the platform 18 is perpendicular to the spin axis of gyroscope 11. When the craft has regained its original heading, the motor 93 will have moved the outer gimbal 20 so that it is no longer at an angle to a plane containing the pitch and roll axes of the aircraft, and the craft in turn under the applied ailerons will have been rotated so that the platform 18 is perpendicular to the vertical gyro spin axis. Thus the craft is in level attitude position on the original heading.

It will be appreciated that similar control of the rotation of the gyro platform 18 may be obtained either from the instrument landing system motor 129 or the gun firing control motor 145. It is further apparent that rotation of the platform 18 in either direction will provide for a corresponding turning and banking of the aircraft which under the applied ailerons assumes an attitude so that the platform 18 and vertical gyroscope spin axis are respectively perpendicular.

In the consideration of the operation of the switching means 300 under the condition wherein the switch arm operator 313 had rotated far enough to terminate operation of the servomotor in a direction tending to increase the angular difference between the craft and heading it was indicated that reverse rotation of the servomotor from the other amplifier relay winding would be permitted. Provision for this reverse operation is available both in networks 103 and 40 Figure 1a. Considering network 40, if the craft attitude in pitch had been so altered in value that the arm 313 had caused the separation of intermediate switch arm 306 and outer switch arm 305, the manually operable trim knob 61 of potentiometer 57 could have been manually adjusted to unbalance network 40. The unbalance of network 40 would effect operation of the motor 28 to rotate platform 18 about axis 19. The rotation of the platform would have caused the relative displacement of slider 260 and resistor 261 of the pitch attitude potentiometer 259. Slider 260 would be moved toward the left to oppositely unbalance the amplifier network 258 to cause operation of the relay winding 242 in the amplifier 227. The operation of the relay arm 249 into engagement with its contact 251 would have completed a circuit to effect opposite rotation of the servomotor 226 to reduce the angular departure of the craft and vertical gyroscope.

It will now be apparent that there has been provided a novel heading and pitch attitude control arrangement for a dirigible craft wherein a platform may be rotated about two axes relative to a vertical gyroscope in response to heading control signals or pitch attitude control signals and wherein such relative angular displacement about one axis effects operation of the ailerons and rudder of an aircraft to cause heading changes by banked turns and rotation about the second axis causes operation of the elevator of the aircraft and in which further means are provided for terminating the operation of corresponding servomotors when the angle of roll or pitch between the craft and gyroscope attains a predetermined value and wherein further means are provided for disengaging the corresponding servomotor from its control surface when the angle of roll or pitch between the craft and gyroscope attains a maximum value.

While Figures 1a and 1b together illustrate an arrangement wherein the switch actuator 313 functions in response to positional differences of the craft and gyro rotor 12, an alternative location of the switch means such as means 300 on the platform 18 rather than on the craft causes the switch actuator such as actuator 313 to operate its associated contacts when the actual craft angular rate about the axis concerned exceeds the called for craft angular rate. The actual angular rate is determined by the magnitude of the control surface displacement which in turn depends on the relative angular rate of platform 18 in one direction due to operation of, for example, motor 93 and its angular rate in the opposite direction due to craft rate of roll. The switch actuator operating means being connected through the operating connection 168 to the gyro rotor 12 may be considered fixed in space. When the actual craft roll rate exceeds the called for roll rate the switching means outer contacts or its inner contacts, as the case may be, will be opened.

In Figure 2 where parts corresponding to those in Figures 1a and 1b are similarly identified, I have shown such modification wherein the base 301 of the switch assembly 300 and the bases of switch assemblies 160, 220 are indicated as being secured to the rotatable platform 18. With the switch assembly 300 for example as thus arranged and with the switch actuator 313 driven from the operating connection 264 from gyro rotor 12 as in Figure 1b a monitoring arrangement prevents the called-for angular rate of the craft, as represented by the rotational speed of motor 41, to be exceeded by the actual craft rate of angular movement due to the displaced elevator surface. Thus the platform 18 is affected on the one hand by the rotation of the motor 41 and is affected on the other hand by the rotation of the craft as a whole. When the two angular rates are in agreement, there will be no relative angular rate of movement of the switch actuator connected to gyro rotor 12 with respect to the platform 18 which supports the switch actuator coacting contacts which may be considered in this instance integral with the base of the switch assembly.

A similar arrangement is provided for the switching means 160 and 220 which control the rudder servomotor 153 and the aileron servomotor 190 respectively. Thus the base member of switch 160 and the base member of 220 are also mounted on platform 18 so that relative movement of the switch actuating members 186 and 221 with respect to their respective base members would only occur if the called-for rate of bank of the aircraft was not in accordance with the actual rate of bank of the craft.

While but a single embodiment of the invention has been illustrated and described, it is apparent that various changes may be made therein without departing from the spirit and scope of the invention.

I claim as my invention:

1. Control apparatus for an aircraft having a control surface for controlling the attitude of said craft about an axis thereof, said apparatus comprising: a servomotor adapted to operate said surface; a platform on said aircraft rotatable relative to said craft about an axis parallel to said axis of the craft; a vertical type gyroscope supported on said platform with one axis of freedom of the gyroscope parallel with said craft axis; a two part control signal pick-off responsive to relative displacement between said gyroscope and platform; operating means for controlling said servomotor from said control signal pick-off; motor means responsive to departure of said craft from a desired condition for rotating said platform relative to said craft in accordance with said departure to set up said control signal; switch means mounted between said aircraft and gyroscope and responsive to the relative angular position of said aircraft and gyroscope and controlling the application of control of said operating means to said servomotor to terminate operation of said servomotor when the craft changes attitude about said axis a predetermined amount whereby the selected amount of rotation may be made to approach the predetermined amount.

2. Control apparatus for an aircraft having a control surface for controlling the attitude of the craft about an axis thereof, said apparatus comprising: a servomotor having a pair of energizing circuits and adapted to operate said surface; a vertical gyroscope having one axis of freedom parallel with the axis of said craft; means for changing the relative angular position of said gyroscope and craft; phase sensitive control means including input terminals and a control signal pickoff of reversible phase connected thereto and operated upon relative movement of said gyroscope and craft; switch means connected to the servomotor responsive to the relative angular position of said craft and gyroscope and connected to output terminals of the control means controlling the application of the effect of said control signal to one or the other of the circuits of said servomotor, to terminate operation of said servomotor upon said craft attaining a predetermined change in attitude about said axis, said servomotor being energized through its other circuit upon reversal in phase of said control signal.

3. Control apparatus for an aircraft having aileron and rudder control surfaces, said apparatus comprising: a platform mounted on said aircraft for rotation about axes parallel with the longitudinal and lateral axes of said aircraft; a vertical type gyroscope supported on said platform with two axes of freedom parallel respectively with the axes of said platform; a pick-off signal generator arranged between said gyroscope and platform and responsive to relative rotation of said platform and gyroscope about an axis parallel to the longitudinal axis of said aircraft; means for controlling the positioning of said ailerons and said rudder in accordance with the magnitude of the signal from said pick-off; compass responsive means operated in accordance with the magnetic heading of said craft; and motor means controlled by the compass responsive means for tilting said platform relative to the longitudinal axis of said craft in accordance with the response of said magnetic compass means whereby banking of the craft in response to said relative rotation of platform and gyroscope returns them to their original relative positions.

4. Control apparatus for ai aircraft having a control surface for controlling its attitude about an axis thereof, said apparatus comprising: a servomotor adapted to operate said surface; a vertical gyroscope having a rotor mounted in a casing which is rotatable about two axes and having one axis thereof aligned with the axis of said aircraft; control means on said craft rotatable relative thereto about an axis parallel to said craft axis; pick-off means responsive to the relative angular position of said gyroscope and said control means; operating means for controlling said servomotor and responsive to said pick-off; switch means including two alternatively operated circuit controlling members responsive to the relative angular position of said craft and gyroscope about said axis of said craft the members being alternatively operated in accordance with the direction of relative angular position for connecting the operating means with said servomotor to terminate operation of said servomotor in one direction upon a predetermined change in attitude of said craft; whereby opposite motor rotation will be effected on opposite rotation of said control means and motor means for operating said control means.

5. Control apparatus for an aircraft having rudder and aileron control surfaces, said apparatus comprising: a servomotor adapted to operate said rudder surface; a servomotor adapted to operate said aileron surface; a vertical gyroscope mounted on said craft and having two axes of freedom thereof aligned with the longitudinal and lateral axes of said craft; a part carried by said craft and rotatable relative thereto about an axis parallel to the longitudinal axis of said craft; a pick-off having two relatively movable elements between said rotatable part and said gyroscope; means for controlling said rudder servomotor and said aileron servomotor from said pick-off; motor means connected to said part and responsive to the change in heading of said craft for operating said rotatable part through one angle in proportion to the change in heading; and means for terminating operation of said rudder servomotor and said aileron servomotor when said craft attains a predetermined angle of bank to limit the magnitude of the bank angle despite the magnitude of said one angle.

6. Control apparatus for an aircraft having a control surface for controlling the attitude of the craft about an axis thereof, said apparatus comprising: a servomotor adapted to operate said surface; a platform on said craft rotatable relative to said craft about an axis parallel to said axis of the craft; a vertical gyroscope supported on said platform with one axis of freedom parallel with said craft axis; a control signal pick-off between said gyroscope and platform; operating means for controlling said servomotor from said control signal; motor means operatively connected with said platform for rotating said platform relative to said craft to set up said control signal; all whereby said platform is restored to a predetermined position relative to said vertical gyroscope; and means including a switch carried by said craft and a switch actuator operated by said gyroscope and responsive to the relative angular position of said gyroscope and craft for terminating operation of said servomotor.

7. Apparatus for correcting changes from an existing condition of a craft in motion comprising: a servomotor adapted to be operatively engaged with means for controlling said condition; a stable reference type sensing device movably mounted on a platform for relative displacement thereto; a pick-off between said platform and stable reference type sensing device; supporting means movably supporting said platform relative to said craft; means including motor means responsive to a change in said condition moving said platform relative to said supporting means to obtain a control signal from said pick-off; means including switching means and said pick-off controlling operation of said servomotor; and means operating said switching means and responsive to a predetermined relative displacement of said stable reference sensing device and supporting means which is equal in magnitude to the relative displacement of the platform and supporting means for terminating operation of said servomotor.

8. Apparatus for controlling a condition of an object in motion comprising: a servomotor adapted to be operatively engaged with suitable means for controlling said condition; an inertial type sensing device mounted on a platform; supporting means on said object movably mounting said platform; a pick-off responsive to relative movement of said platform and inertial device; motor means reversibly moving said platform relative to said supporting means to obtain a control signal from said pick-off; error sensing means responsive to said condition controlling the motor means; operating means controlling said servomotor from said pick-off including switching means; means responsive to a predetermined relative displacement of said inertial device and supporting means resulting from operation of said condition controlling device operating said switching means and terminating operation of said servomotor in one direction; and further means including said pick-off operative thereafter on reverse displacement of said platform relative to said supporting means by said motor upon decrease of said error for effecting reverse operation of said servomotor.

9. The apparatus of claim 7 and further means responsive to a maximum relative angular displacement of said inertial device and supporting means for disengaging said servomotor from said condition controlling device.

10. Control apparatus for an aircraft having aileron and rudder control surfaces, said apparatus comprising: a platform mounted for rotation about axes parallel with the longitudinal and lateral axes of said aircraft; a vertical gyroscope supported on said platform with two of its axes parallel respectively with the axes of said platform; a pick-off signal generator between said gyroscope and platform responsive to relative rotation of said platform and gyroscope about an axis parallel to the longitudinal axis of said aircraft; operating means connected to said pick-off and to said aileron and rudder surfaces for controlling the positioning of said ailerons and said rudder in accordance with the magnitude of the signal from said pick-off; sensitive means for detecting displacement of said craft from a desired course; and operating means connected to said platform and to said sensitive means for tilting said platform relative to the longitudinal axis of said craft in accordance with the response of said sensitive means.

11. Control apparatus for an aircraft having a control surface which when displaced from a normal position exerts a moment on the aircraft tending to cause a change in craft attitude at a rate depending upon its displacement; said apparatus comprising: a servomotor adapted to operate said surface; a platform on said craft rotatable relative to said aircraft about an axis parallel to said axis of the craft; a vertical gyroscope supported on said platform with one axis of angular freedom of said gyroscope parallel with said craft axis; a control signal pick-off operated upon relative displacement between said gyroscope and platform; operating means connected to said pick-off and said servomotor for controlling said servomotor from said control signal; motor means for rotating said platform relative to said craft at one rate to set up said control signal; a switching device having one part mounted on said platform and another part connected to said gyroscope; circuit means for said servomotor controlled by said switch means; whereby operation of said servomotor is terminated when the craft angular rate exceeds the rate of rotation of said platform.

12. Control apparatus for an aircraft having aileron control surfaces for applying moments to the craft about its roll axis to determine its angular rate of bank, said apparatus comprising: a servomotor adapted to operate said aileron surfaces; a vertical gyroscope having one axis of freedom parallel with the axis of said craft; a pick-off associated with the gyroscope for providing a bank signal, said pick-off having one part connected to rotate with the gyroscope about said axis and another part rotatably mounted on said craft; motor means for operating the other part of the pick-off for changing the relative angular position of said two parts of said pick-off in a direction and rate opposed to that caused by the movement of the craft from the displaced aileron surfaces; switch means having a part that is rotated with said other part of said pick-off and a part rotated with the one part of the pick-off and responsive to the relative angular rate of said motor means and said craft relative to said gyroscope; and circuit means operated by said switch means for terminating operation of said servomotor from said signal pick-off upon the speed of the craft relative to the gyroscope exceeding the speed of the motor relative to the gyroscope.

References Cited in the file of this patent

UNITED STATES PATENTS

| | | |
|---|---|---|
| 2,646,947 | Kutzler et al. | July 28, 1953 |
| 2,663,001 | Rusler et al. | Dec. 15, 1953 |
| 2,665,086 | Moog et al. | Jan. 5, 1954 |
| 2,673,314 | MacCallum | Mar. 23, 1954 |
| 2,674,711 | MacCallum | Apr. 6, 1954 |
| 2,681,777 | Rossire | June 22, 1954 |
| 2,801,816 | Meredith | Aug. 6, 1957 |